United States Patent [19]
Evans, II et al.

[11] Patent Number: 5,797,345
[45] Date of Patent: Aug. 25, 1998

[54] ILLUMINATED POINTER FOR INSTRUMENT GAGE

[75] Inventors: William J. Evans, II, Brighton; Michael J. Kowalski, Troy, both of Mich.

[73] Assignee: Ford Global Technologies, Inc., Dearborn, Mich.

[21] Appl. No.: 748,078

[22] Filed: Nov. 13, 1996

[51] Int. Cl.⁶ .................. G01D 13/28; G04B 19/04; G04B 19/32

[52] U.S. Cl. .................. 116/286; 116/288; 116/332; 116/DIG. 6; 116/DIG. 35; 368/228; 368/238; 368/84

[58] Field of Search .................. 116/286, 287, 116/288, 328, 332, DIG. 6, DIG. 35, DIG. 36; 340/815.78; 362/23, 29; 368/226, 228, 238

[56] References Cited

U.S. PATENT DOCUMENTS

| | | | |
|---|---|---|---|
| 2,287,605 | 6/1942 | Dickson et al. | |
| 3,071,105 | 1/1963 | Wertheimer | 116/288 X |
| 3,219,008 | 11/1965 | Harris et al. | 116/288 X |
| 4,163,428 | 8/1979 | Ishikawa | 116/288 |
| 4,258,643 | 3/1981 | Ishikawa et al. | 116/286 |
| 4,323,951 | 4/1982 | Pasco | 362/27 |
| 4,380,043 | 4/1983 | Takamatsu et al. | 362/26 |
| 4,625,262 | 11/1986 | Sakakibara et al. | 362/26 |
| 4,777,480 | 10/1988 | Okamoto et al. | 340/688 |
| 4,860,170 | 8/1989 | Sakakibara et al. | 362/26 |
| 4,878,453 | 11/1989 | Inoue et al. | 116/288 |
| 5,003,914 | 4/1991 | Mayer | 116/332 |
| 5,050,045 | 9/1991 | Kato et al. | 362/23 |
| 5,078,079 | 1/1992 | Ohta et al. | 116/288 |
| 5,142,453 | 8/1992 | Ohta et al. | 362/29 |
| 5,143,434 | 9/1992 | Ohta et al. | 362/29 |
| 5,320,062 | 6/1994 | Masuda et al. | 116/286 X |
| 5,630,373 | 5/1997 | Kato et al. | 116/288 |
| 5,631,448 | 5/1997 | Rabinowitz et al. | 177/177 |
| 5,697,322 | 12/1997 | Hay et al. | 116/286 |

FOREIGN PATENT DOCUMENTS

| | | | |
|---|---|---|---|
| 961694 | 5/1950 | France | 116/286 |
| 4-113225 | 4/1992 | Japan | 362/29 |
| 2294588 | 5/1996 | United Kingdom . | |

*Primary Examiner*—Thomas B. Will
*Assistant Examiner*—Willie Morris Worth
*Attorney, Agent, or Firm*—Paul K. Godwin

[57] ABSTRACT

Electrical instrument gage that has a pointer indicator member mounted on a rotatable shaft extending from the gage and including an electrically energizable light source mounted on and extending along the pointer portion of the indicator member. The light source is preferably an electroluminescent lamination that contains a pair of flex circuit terminal contacts extending from its base end. The light source is adhesively attached to the pointer portion of the indicator member. The base element of the indicator member contains a socket portion with a cylindrical opening configured to provide a friction fit to the axial shaft extending from the gage. The outer cylindrical surface of the socket contains an electrically conductive area and the gage contains an electrical wiper contact that makes continual electrical interconnection with the conductive portion of the socket over its rotational range. This electrical interconnection provides the power for the light source that is attached to the instrument pointer.

8 Claims, 2 Drawing Sheets

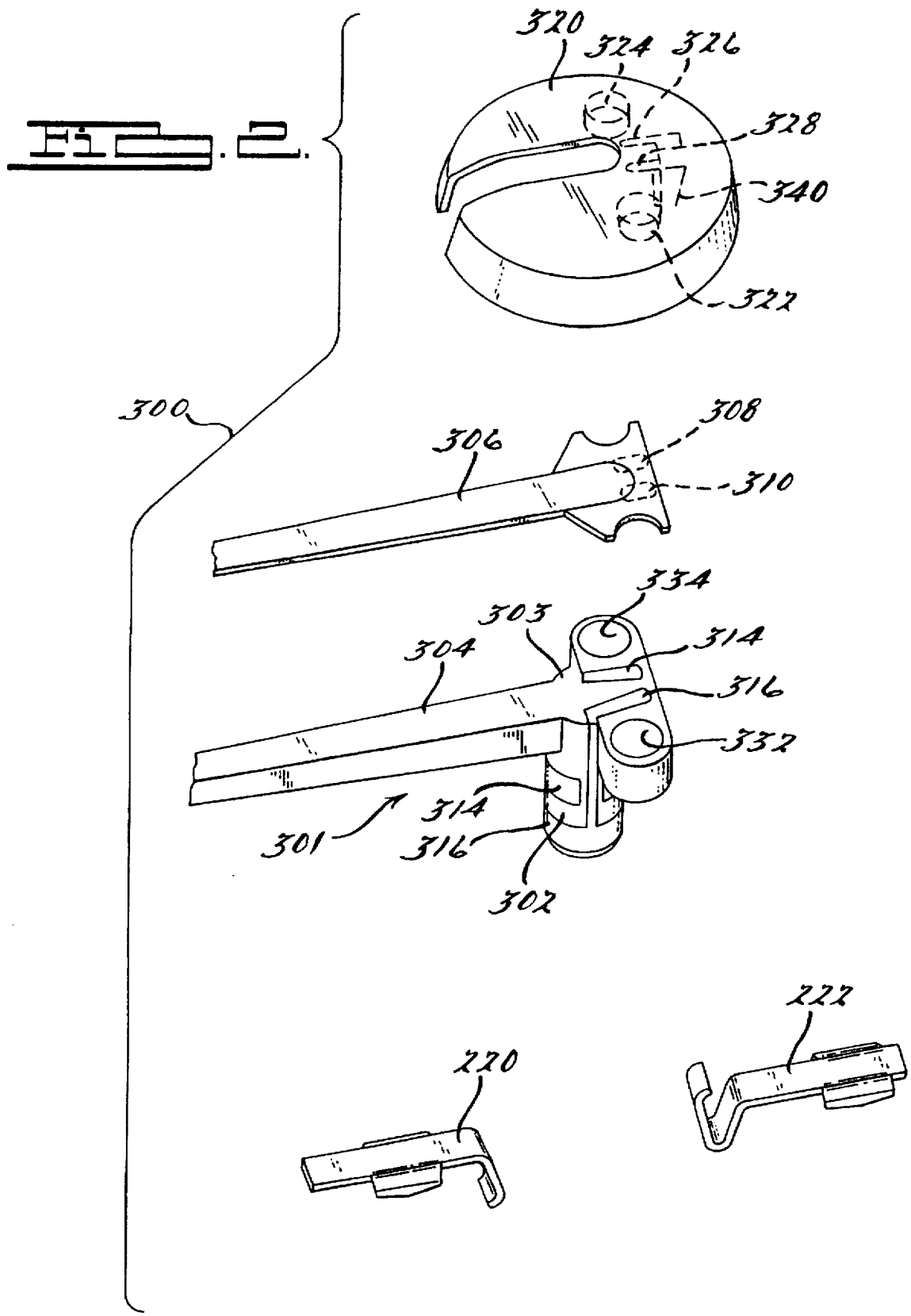

ILLUMINATED POINTER FOR INSTRUMENT GAGE

BACKGROUND OF THE INVENTION

The present invention is directed to the field of instrument gages and more particularly to the area of illuminated pointers for such gages.

In the prior art, there are several known attempts to provide instrument gage pointers with electrically energized illumination devices. In some cases the illuminating light source is provided on the stationary portion of the gage and light from the source is ducted through an optically transparent pointer to provide the illumination desired. In other cases, the illuminating light source is at the base of the movable pointer. Electrical connections are made through hair spring wires that allow the light source to be rotated with the pointer and remain energized. Again as in the previous example, the pointer is made of an optionally transparent medium so as to distribute the light along its length from the light source at its base. In another example, the light source is an elongated discharge tube that serves as the pointer and is electrically connected through hair spring wires to the gage.

In each of these prior art examples, the large number of components and the resulting complexity associated with assembly makes the gages relatively expensive.

SUMMARY OF THE INVENTION

The present invention is intended to overcome many of the disadvantages of the prior art by providing an electrical instrument gage that has a pointer indicator member mounted on a rotatable shaft extending from the gage and including an electrically energizable light source mounted on and extending along the pointer portion of the indicator member. The light source is preferably an electroluminescent lamination that contains a pair of flex circuit terminal contacts extending from its base end. The light source is adhesively attached to the pointer portion of the indicator member. The base element of the indicator member contains a socket portion with a cylindrical opening configured to provide a friction fit to the axial shaft extending from the gage. The outer cylindrical surface of the socket contains an electrically conductive area and the gage contains an electrical wiper contact that makes continual electrical interconnection with the conductive portion of the socket over its rotational range. This electrical interconnection provides the power for the light source that is attached to the instrument pointer.

BRIEF DESCRIPTION OF THE DRAWINGS

FIG. 2 is an exploded view of the illuminated indicator portion of the gage and associated components.

DETAILED DESCRIPTION OF THE PREFERRED EMBODIMENT

Figure 1:
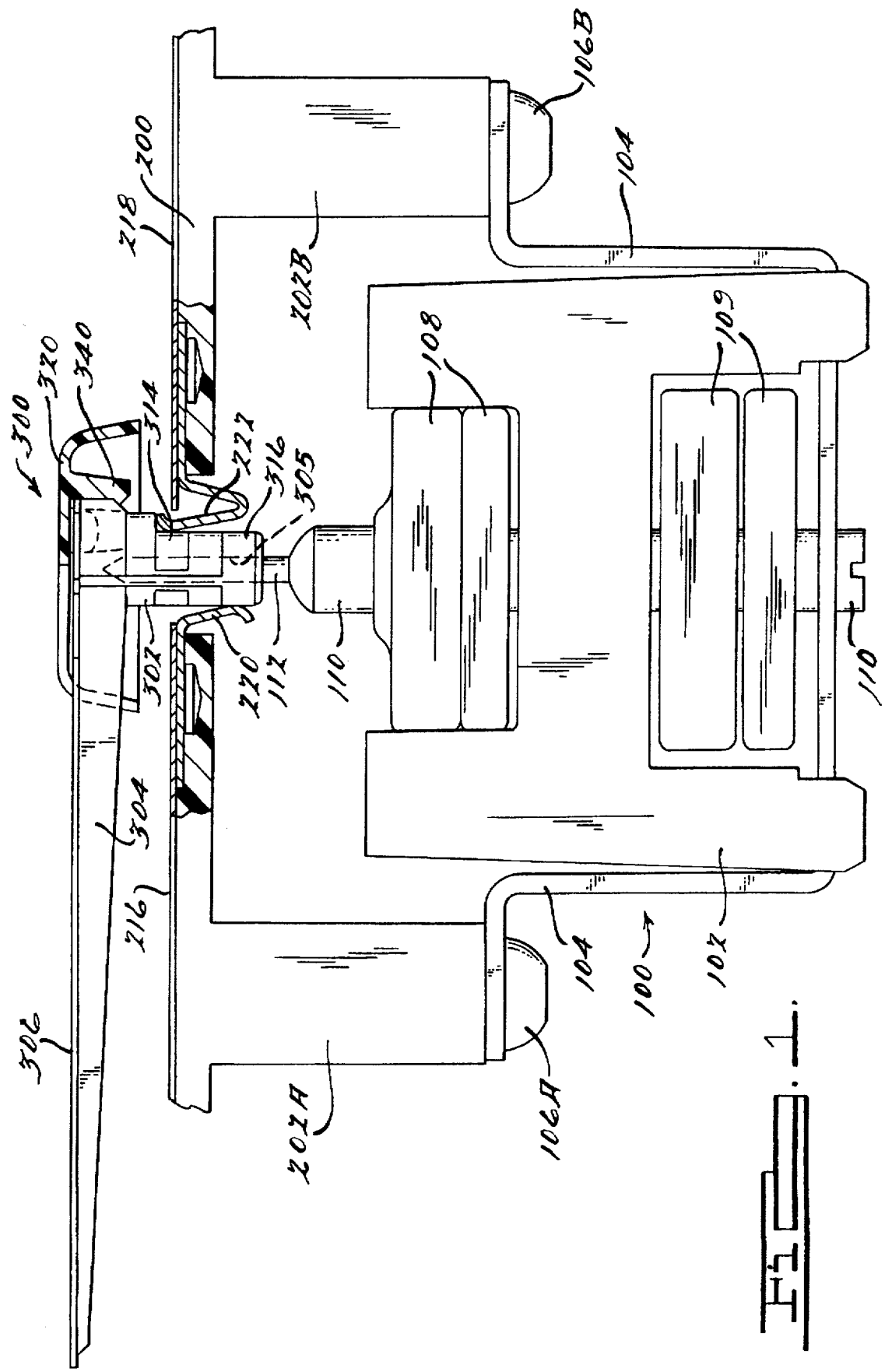
FIG. 1 is an elevational cross-section of the instrument gage of the present invention.

A preferred embodiment of the present invention is shown in FIG. 1, installed on a conventional air core gage 100. The air core gage 100 contains a mounting bracket 104 that is attached to a support member with support post 202a and 202b. The attachment is made with fasteners 106a and 106b respectively. The gage 100 includes a frame 102, winding 108 and 109 and a rotor element 110. Rotor 110 includes an axial shaft member 112. The shaft member 112 rotates to positions as dictated by the electrical input to the gage 100 through its leads (not shown), in a conventional manner.

The indicator member of the present invention is commonly referred to as a "pointer". The indicator member assembly is 300 shown in both FIGS. 1 and FIGS. 2 and the reader should refer to both Figures in association of the following discussion.

Indicator member assembly 300 includes a pointer indicator member 301, a light source 306 and a cap member 320. The pointer indicator member 301 is an unitary structure preferable of a molded plastic material and includes an elongated and generally narrow pointer portion 304 which extends from a base element 303. The base element 303 includes a socket portion 302 that contains a cylindrical opening 305 that is sized to provide a pressed (friction) fit onto axial shaft member 112. The socket portion also includes an outer cylindrical surface that contains a first electrically conductive area 314 over a predetermined portion of the surface. In the embodiment shown, conductive area 314 encircles a major portion of the socket portion 302 and extends up and over the top of the base element 303 as shown in FIG. 2. A second electrically conductivity area 316 is also shown as extending over a major portion of the socket portion 302 and extending upwards to the top of the base element 303 as shown in FIG. 2.

In a preferred embodiment, base element 303 and its socket portion 302 along with the elongated and generally narrow pointer portion 304 are formed as an integrated unit.

The electrically conductive portions 314 and 316 can be applied by several different methods. For instance, electrically conductive areas can be formed by an electrically conductive material that is insert molded so that the remainder of the indicator member 301 is formed over the electrically conductive material to capture the material during the molding process. Another method is a wipe or fill-in method whereby a conductive fluidic material is allowed to flow into a series or recesses or voids formed on the molded socket portion. After the fluidic material is caused to solidify, the conductive areas are formed on the socket portion. Another technique would be a chemical or photo-chemical process whereby a conductive coating is deposited on the socket and photo-etched to form the preferred areas of conduction. Still another type of process is a decal or foil-stamped method whereby conductive foils of materials are transferred under heat and/or pressure from a carrier film to the socket surface.

In a preferred embodiment, the conductive areas are formed by using a conductive thermoplastic material which is a filled POM(acetal) where POM is a poly(oxyl methylene)polymer or copolymer. A 2-shot or co-injection molding process is used to form the indicator member along with the conductive areas. The use of conductive thermoplastic is viewed as the preferred material in this application because it has a better wipe contact wear resistance which adds to its robustness and allows one to provide for consistent quality components in mass production quantities.

The light source 306 is adhesively mounted to co-extend over a portion of the elongated pointer portion 304. The light source 306, in this case, is an electroluminescent lamp formed in a lamination that encapsulates the electroluminescent material and includes a pair of electrical contact areas 308 and 310 which extend from one end thereof. The elongated electroluminescent lamp 306 is mounted to the outer surface of the pointer portion 304 so that the contact areas 308 and 310 overlay and make contact with electric leads 314 and 316 on the base 303 of indicator member 301. An electroluminescent light source "EL" was selected for the present embodiment because of its low power requirements (approximately 1/1000 the amperage of a typical incandescent lamp and 1/5 that of an L.E.D.) In addition, the EL has a very low mass that allows for the total pointer mass to be designed about the axis of rotation. Many other advantages such as color selection with topological light filters and serviceability of the light source are also realized.

Cap member 320 provides two functions in the current embodiment. Firstly, cap member 320 provides compression contact between the contact areas 308 and 310 on the lamp source 306 to the electrical contact areas 314 and 316 on the base 303. Secondly, cap member 320 shields the interconnection and base of the indicator member 301 from view. Cap member 320 contains a pair of attachment protrusions 322 and 324 that extend below the cap. These protrusions are configured to mate with corresponding apertures 332 and 334 on base element 303. The protrusions 322 and 324 provide alignment for the cap so that when it is assembled onto the indicator member 301, it is properly oriented. A catch mechanism 340 provides a snap fit to the base element as shown in FIG. 1.

Electrically wiper terminals 220 and 222 are shown mounted on support member 200 so as to provide electrical contact between the wipers and the electrically conductive areas 314 and 316 on the socket portion 302. This electric contact is provided throughout the rotational range of the indicator member. Lead wires 216 and 218 are mounted on the support structure 200 and are connected to the wiper terminals 220 and 222. Electrically energy is provided through lead wires 216 and 218 so as to provide appropriate electrical energization for the light source 306.

In the alternative, power may be communicated to wiper terminals 220 and 222 via respective connections to opposing film electrodes of an electroluminescent face plate where lead wires 216 an 218 are presently shown.

The foregoing embodiment has several advantages over the prior art. A plastic pointer body shaft with electrical conductors integrally formed therein, means that the material used for the pointer can be relatively inexpensive and a non-optical plastic (non transparent) material. The pointer assembly can be made to be relatively light in weight (mass) because it neither requires the use of counter balance weights, nor involve the high mass that results with light piping material when an LED or other conventional light source is used on the rotating pointer. It also eliminates the use of the very delicate spider wires and eliminates the need to mask portions of an optical pointer with a separate paint step in order to define the area through which light is allowed to luminate.

It should be understood that the present invention described herein is illustrative and the terminology used is intended to be in the nature of words of description rather than limitation. It should be further understood that many modifications and variations of the present invention are possible in light of the above teachings. Therefore, it is believed that, within the scope of the appended claims, the present invention may be practiced otherwise than as specifically described.

We claim:

1. An electrical instrument gauge comprising:

an axial shaft member that is mounted on said gauge to be rotated about its axis in response to electrical signals applied to said gauge, and an indicator member mounted on said shaft member to rotate with said shaft member and sweep said indicator member over a predetermined arcuate rotational range and along a plane that is transverse to said axis, wherein said indicator member includes:

a base element at one end of said indicator member;

an elongated and generally narrow pointer portion that extends in a radial direction from said base element:

an electrically energizable light source mounted on and extending along said pointer portion and said light source having first and second electrical contact areas formed at one end;

a socket portion in said base element having a cylindrical opening formed about a central axis that is concentric with said axis of said shaft member when mounted on said shaft member and sized to allow for a compression attachment to said shaft member;

said socket portion has an outer cylindrical surface that contains first and second electrically conductive areas extending over separate portions of the circumference of said surface and respectively interconnects to said first and second source contact areas; and said gauge contains first and second fixed electrical wiper contacts that respectively make continual electrical interconnection with said first and second conductive portions of said socket portion over its rotational range.

2. An instrument gauge as in claim 1, further including a cap member that mounts on the base element of said indicator member to provide compression forces between said light source contact areas and respective ones of said conductive areas and provide said interconnects therebetween.

3. An instrument gauge as in claim 1, wherein said light source is an elongated electroluminescent lamp that is laminated on the pointer portion and said contact areas extend from one end thereof adjacent the base element of said indicator member.

4. An instrument gauge as in claim 3, wherein said light source is adhesively attached to said pointer portion.

5. An instrument gauge comprising:

a shaft mounted on said gauge for rotation about its longitudinal axis, and an indicator mounted on said shaft to rotate with said shaft and to be swept over a predetermined arcuate rotational range along a plane that is transverse to said axis, wherein said indicator includes:

a base formed at one end of said indicator;

an elongated and generally narrow pointer portion formed to extend in a radial direction from said base;

an electrically energizable light source mounted on and extending along said pointer portion and said light source having first and second contact areas at one end thereof;

a socket formed in said base having a cylindrical opening formed about a central axis that is concentric with said axis of said shaft when mounted on said shaft and having an outer cylindrical surface that contains first and second electrically conductive areas that extend over separate portions of the circumference of said surface and are respectively interconnected to said first and second source contact areas; and said gauge contains first and second electrical wiper contacts that make continual electrical interconnection to said first and second conductive areas of said socket over its rotational range.

6. An instrument gauge as in claim 5, wherein said light source is an elongated electroluminescent lamp that is laminated on the pointer portion of said indicator and said first and second contact areas extend from one end thereof adjacent said base of said indicator.

7. An instrument gauge as in claim 6, wherein said light source is adhesively attached to said pointer portion of said indicator.

8. An instrument gauge as in claim 7, wherein said said base, said pointer portion and said socket is an integral molding.

* * * * *